US012681543B2

(12) United States Patent
Yang et al.

(10) Patent No.: US 12,681,543 B2
(45) Date of Patent: Jul. 14, 2026

(54) ROTATION SHAFT ASSEMBLY, ELECTRONIC APPARATUS, AND ROTATION METHOD

(71) Applicant: Lenovo (Beijing) Limited, Beijing (CN)

(72) Inventors: Feng Yang, Beijing (CN); Detao You, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 161 days.

(21) Appl. No.: 18/181,254

(22) Filed: Mar. 9, 2023

(65) Prior Publication Data

US 2023/0350468 A1 Nov. 2, 2023

(30) Foreign Application Priority Data

Mar. 31, 2022 (CN) .......................... 202210344691.1

(51) Int. Cl.
*G06F 1/16* (2006.01)
(52) U.S. Cl.
CPC ................................. *G06F 1/1681* (2013.01)
(58) Field of Classification Search
CPC ................................ H05K 7/00; G06F 1/1681
See application file for complete search history.

(56) References Cited

U.S. PATENT DOCUMENTS

| | | | | |
|---|---|---|---|---|
| 2013/0318746 A1* | 12/2013 | Kuramochi | ........... | G06F 1/1681 16/371 |
| 2016/0083988 A1* | 3/2016 | Hsu | ....................... | G06F 1/1681 361/679.01 |
| 2021/0018960 A1* | 1/2021 | Kato | ..................... | G06F 1/1618 |
| 2023/0143511 A1* | 5/2023 | Xi | ........................... | G09F 9/301 361/679.27 |

* cited by examiner

*Primary Examiner* — Imani N Hayman
*Assistant Examiner* — Rashen E Morrison
(74) *Attorney, Agent, or Firm* — ANOVA LAW GROUP, PLLC

(57) ABSTRACT

A rotation shaft assembly includes a connector, a first rotation shaft, a second rotation shaft, and a lock mechanism. The first rotation shaft is rotatably connected to the connector. The second rotation shaft is rotatably connected to the connector. The lock mechanism is arranged between the first rotation shaft and the second rotation shaft and is configured to switch a rotation of the first rotation shaft and a rotation of the second rotation shaft. In response to being at a first predetermined position, the rotation of the first rotation shaft is unlocked, and the rotation of the second rotation shaft is locked. In response to being at a second predetermined position, the rotation of the first rotation shaft is locked, and the rotation of the second rotation shaft is unlocked.

20 Claims, 17 Drawing Sheets

31

312

311

341

3413

3411

3412

ROTATION SHAFT ASSEMBLY, ELECTRONIC APPARATUS, AND ROTATION METHOD

CROSS-REFERENCE TO RELATED APPLICATION

This application claims priority to Chinese Patent Application No. 202210344691.1, filed on Mar. 31, 2022, the entire content of which is incorporated herein by reference.

TECHNICAL FIELD

The present disclosure relates to the electronic apparatus technology field and, more particularly, to a rotation shaft assembly, an electronic apparatus, and a rotation method.

BACKGROUND

An electronic apparatus includes many different members. A rotation operation of the members needs to be performed through a rotation shaft assembly. For example, a laptop computer includes at least a display panel and a base. When the laptop is not in use, the display panel is closed together with the base. When the laptop is in use, the display panel can be rotated relative to the base through the rotation shaft assembly to be opened to an appropriate angle.

The rotation shaft assembly generally includes two rotation shafts. By rotating the two rotation shafts, the display panel and the base having a certain thickness can be rotated in a plurality of angles, e.g., from 0° to 360°.

However, the two rotation shafts in the rotation shaft assembly are not limited. The entire rotation operation is realized only by adaptive friction of different positions of the rotation shaft assembly. Thus, in some embodiments, since there is no physical stop point, the two rotation shafts can perform linkage movement. Thus, the switching logic of the two rotation shafts is not synchronous to cause distortion or damage to the display panel.

SUMMARY

Embodiments of the present disclosure provide a rotation shaft assembly, including a connector, a first rotation shaft, a second rotation shaft, and a lock mechanism. The first rotation shaft is rotatably connected to the connector. The second rotation shaft is rotatably connected to the connector. The lock mechanism is arranged between the first rotation shaft and the second rotation shaft and is configured to switch between a rotation of the first rotation shaft and a rotation of the second rotation shaft. In response to being at a first predetermined position, the rotation of the first rotation shaft is unlocked, and the rotation of the second rotation shaft is locked. In response to being at a second predetermined position, the rotation of the first rotation shaft is locked, and the rotation of the second rotation shaft is unlocked.

Embodiments of the present disclosure provide an electronic apparatus, including a rotation shaft assembly, a first body, and a second body. The rotation shaft assembly includes a connector, a first rotation shaft, a second rotation shaft, and a lock mechanism. The first rotation shaft is rotatably connected to the connector. The second rotation shaft is rotatably connected to the connector. The lock mechanism is arranged between the first rotation shaft and the second rotation shaft and is configured to switch between a rotation of the first rotation shaft and a rotation of the second rotation shaft. In response to being at a first predetermined position, the rotation of the first rotation shaft is unlocked, and the rotation of the second rotation shaft is locked. In response to being at a second predetermined position, the rotation of the first rotation shaft is locked, and the rotation of the second rotation shaft is unlocked. The first body and the second body are connected by the rotation shaft assembly and being rotated relatively.

Embodiments of the present disclosure provide a rotation method of an electronic apparatus. The method includes performing a rotation operation on a body of the electronic apparatus through a rotation of a first rotation shaft and a rotation of a second rotation shaft, in response to the body of the electronic apparatus being rotated to a first predetermined position around the second rotation shaft, unlocking the rotation of the first rotation shaft, and locking the rotation of the second rotation shaft, and in response to the body of the electronic apparatus being rotated to a second predetermined position around the first rotation shaft, locking the rotation of the first rotation shaft, and unlocking the rotation of the second rotation shaft to rotate the body of the electronic apparatus around the second rotation shaft.

REFERENCE NUMERALS

| | | |
|---|---|---|
| 1 First body | 2 Second body | 3 Rotation shaft assembly |
| 31 Connector | 311 Guide hole | 312 Block |
| 32 First rotation shaft | 321 First shaft body | 322 First shaft sleeve |
| 323 Spiral guide groove | 33 Second rotation shaft | 331 Second shaft body |
| 332 Second shaft sleeve | 34 Lock mechanism | 341 Lock member |
| 3411 Lock body | 3412 Guide member | 3413 Sliding member |
| 3414 Connection barrel | 3415 Lock part | 342 Stopper member |
| 343 First wheel | 344 Second wheel | 345 Sliding block |
| 346 Block member | | |

DETAILED DESCRIPTION OF THE EMBODIMENTS

The technical solution of the present disclosure is further described in detail with reference to the accompanying drawings and embodiments of the present disclosure.

In embodiments of the present disclosure, unless explicitly stated or limited otherwise, the term "connection" is to be understood broadly, for example, the term "connection" can be a fixed connection, a detachable connection, or an integrated body. The term "connection" can also be a direct connection or indirect connection through a medium.

The terms "first \ second \ third" referred to embodiments of the present disclosure are only used to distinguish similar objects, and do not represent a specific order for the objects. "first \ second \ third" can exchange a specific order or sequence when allowed. The objects distinguished by "first \ second \ third" can be exchanged in an appropriate situation. Thus, embodiments of the present disclosure can be implemented in an order other than those illustrated or described here.

The electronic apparatus of embodiments of the present disclosure can be any electronic apparatus including a rotation shaft assembly. Any electronic apparatus that requires the rotation shaft assembly to perform a multi-axis rotation can be the scope of embodiments of the present disclosure. For example, the electronic apparatus can include a laptop computer, a folding cellphone, a tablet computer with a rotation keyboard, a server, and an all-in-one computer.

Figure 1:
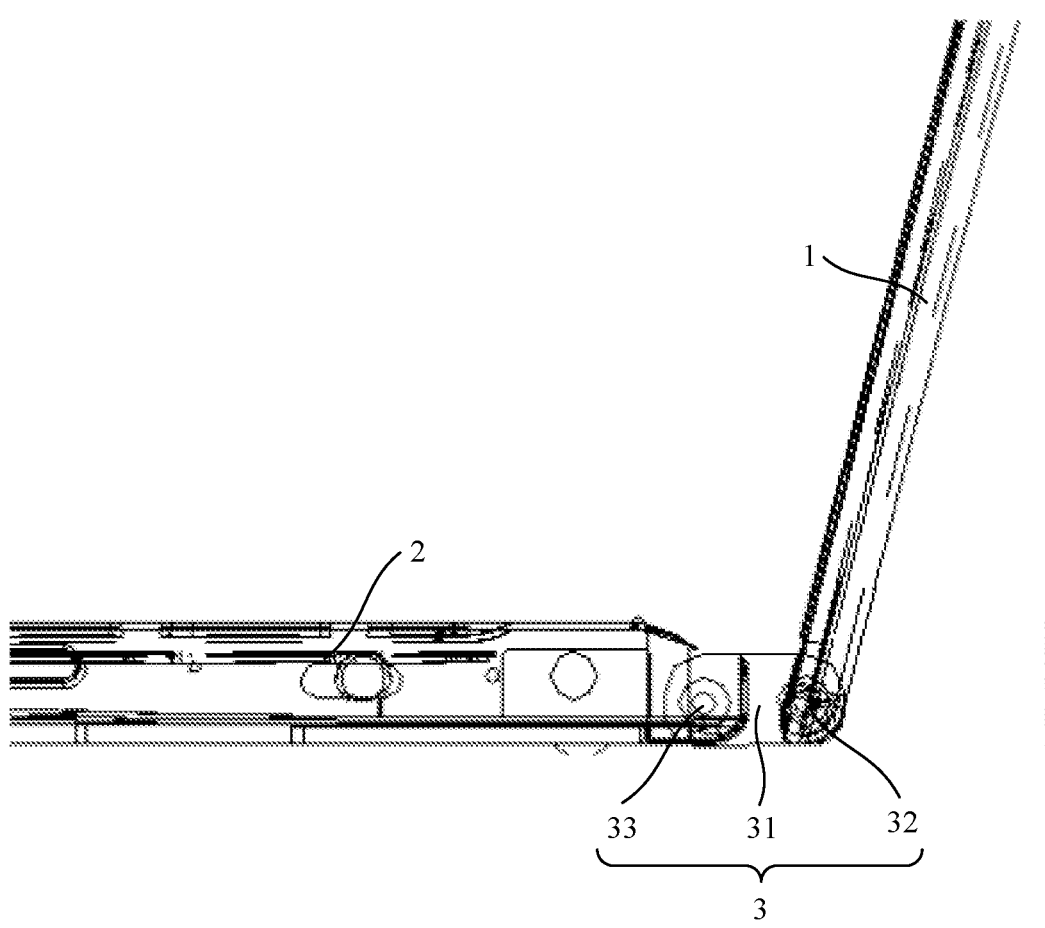
FIG. 1 illustrates a schematic structural diagram of an electronic apparatus according to embodiments of the present disclosure.

With reference to FIG. 1, the electronic apparatus includes a first body 1 and a second body 2. To facilitate description, the electronic apparatus can be, for example, a laptop computer. The laptop computer generally includes a display panel and a base. The display panel and the base can be hinged through a rotation shaft assembly and can be rotated relatively. In the electronic apparatus of embodiments of the present disclosure, the rotation shaft assembly between the display panel and the base can include two rotation shafts. The two rotation shafts can be switched logically at a determined position to perform an adaptive rotation operation to prevent the members from being damaged.

Figure 2:
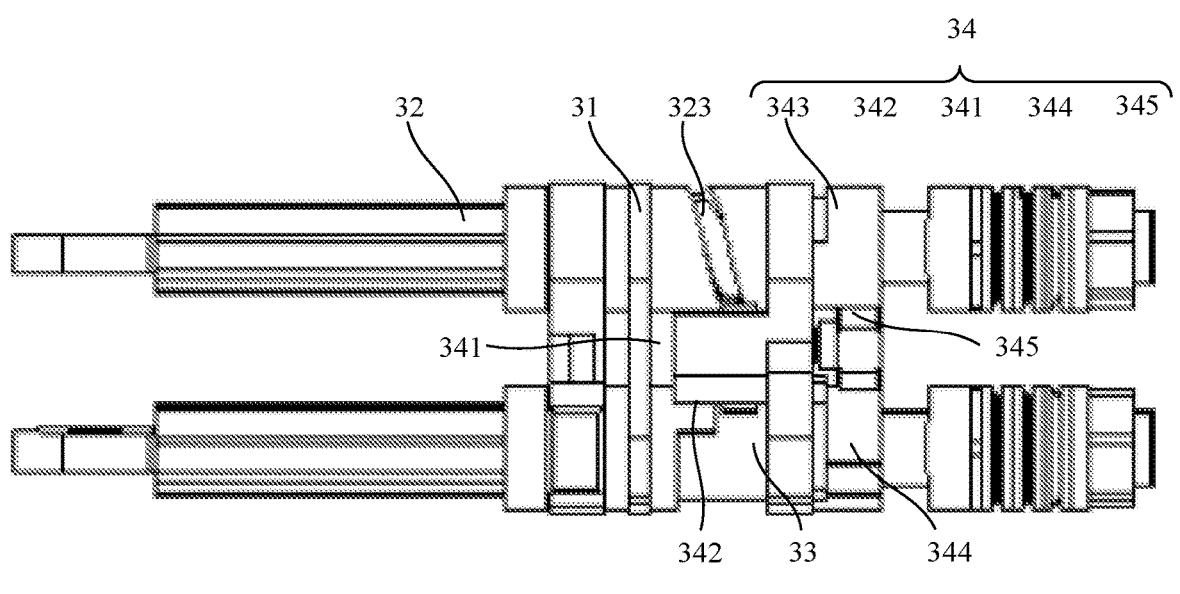
FIG. 2 illustrates a schematic structural diagram of a rotation shaft assembly according to embodiments of the present disclosure.
Figure 3:
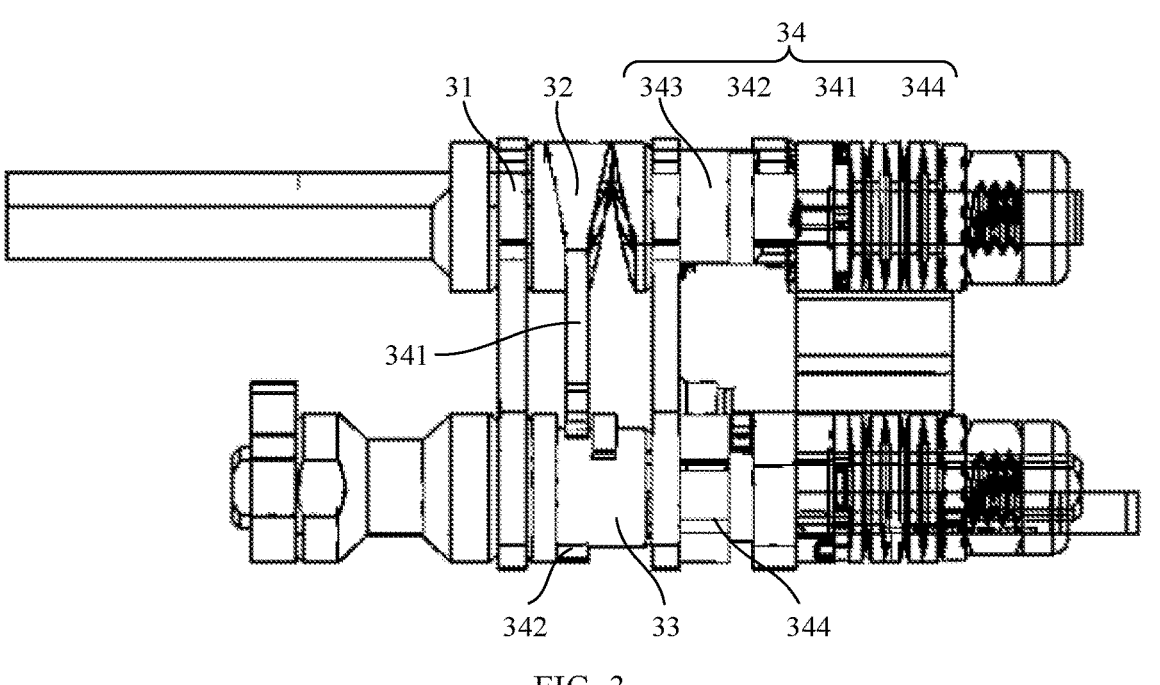
FIG. 3 illustrates a schematic structural diagram of a rotation shaft assembly according to embodiments of the present disclosure.
Figure 4:
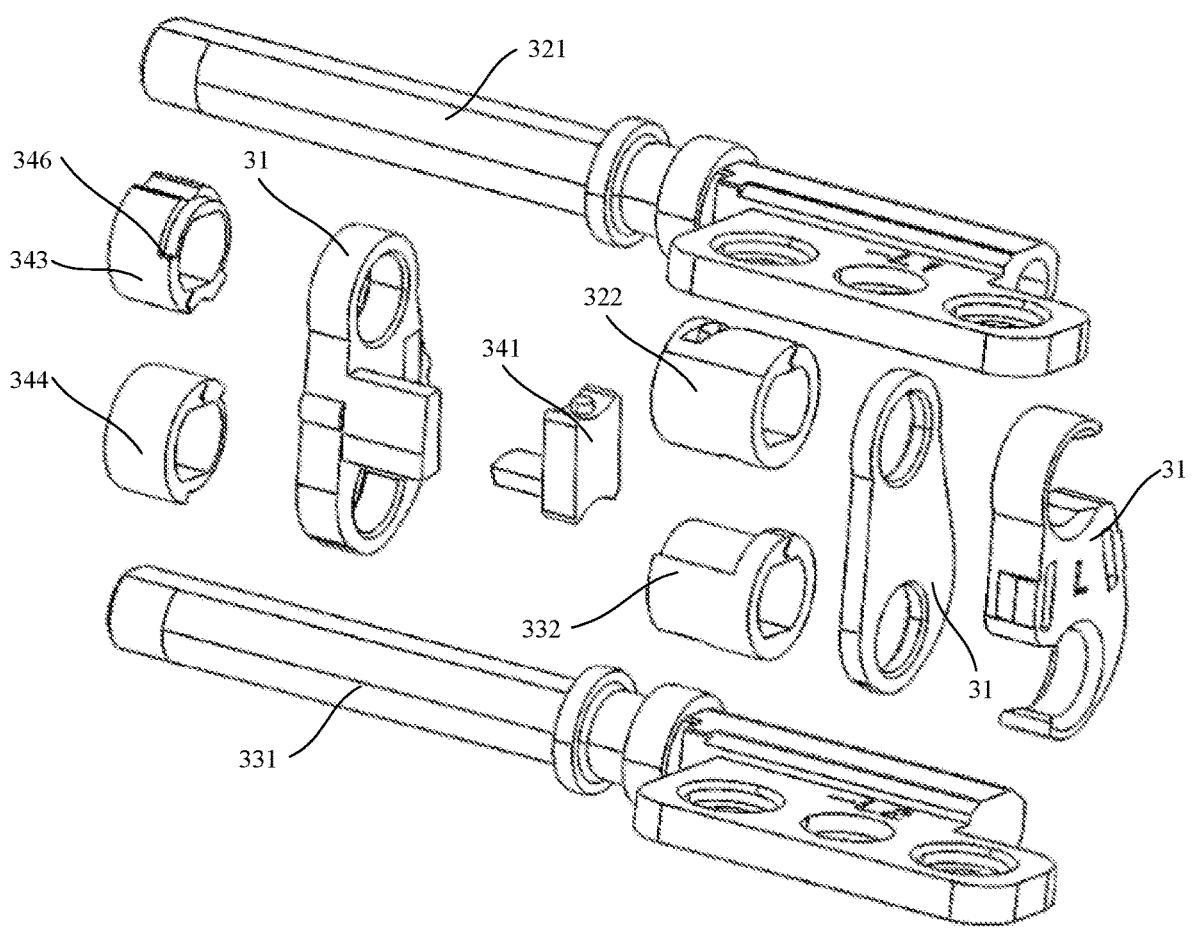
FIG. 4 illustrates a schematic exploded diagram of a rotation shaft assembly according to embodiments of the present disclosure.

Meanwhile, embodiments of the present disclosure further provide a rotation shaft assembly. With reference to FIGS. 2, 3, and 4, the rotation shaft assembly 3 includes a connector 31, a first rotation shaft 32, and a second rotation shaft 33. Both the first rotation shaft 32 and the second rotation shaft 33 can be rotatably connected to the connector 31. The rotation assembly 3 also includes a lock mechanism 34. The lock mechanism 34 is arranged between the first rotation shaft 32 and the second rotation shaft 33 and configured to switch between a rotation of the first rotation shaft 32 and a rotation of the second rotation shaft 33. When the lock mechanism 34 is at a first predetermined position, the rotation of the first rotation shaft 32 can be unlocked, and the rotation of the second rotation shaft 33 can be locked. When the lock mechanism 34 is at a second predetermined position, the rotation of the first rotation shaft 32 can be locked, and the rotation of the second rotation shaft 33 can be unlocked.

In the rotation shaft assembly 3 of embodiments of the present disclosure, with reference to FIG. 2, FIG. 3, and FIG. 4, the rotation of the first rotation shaft 32 and the second rotation shaft 33 of the rotation shaft assembly 3 can be switched at a specific position through the lock mechanism 34. The specific position can at least include a first predetermined position and a second predetermined position. When the lock mechanism 34 is at the first predetermined position, the rotation of the first rotation shaft 32 can be unlocked, and the rotation of the second rotation shaft 33 can be locked. That is, the rotation shaft assembly 3 can be switched to the rotation of the first rotation shaft 32. When the lock mechanism 34 is at the second predetermined position, the rotation of the first rotation shaft 32 can be locked, and the rotation of the second rotation shaft 33 can be unlocked. That is, the rotation shaft assembly 3 can be switched to the rotation of the second rotation shaft 33. Thus, by setting different predetermined positions, the rotation of the first rotation shaft 32 and the second rotation shaft 33 can be switched. The rotation of the rotation shaft assembly 3 can be logically switched to adapt to the rotation operation and prevent the members from being damaged.

The connector 31 can be a member configured to connect the first rotation shaft 32 and the second rotation shaft 33, which can be implemented in a plurality of manners as needed. With reference to FIG. 4, the connector 31 includes at least three connection pieces. The first rotation shaft 32 and the second rotation shaft 34 are connected through the three connection pieces that are arranged side by side. Other members of the rotation shaft assembly 3 can be arranged between the three connection pieces. A first rotation wheel 343, a second rotation wheel 344, and a sliding block 345 are arranged at a connection piece on a left side in FIG. 4. A structure related to the lock member 341 is arranged between the connection piece on the left side and the connection piece in the middle.

For the laptop computer, the first rotation shaft 32 can be an LCD shaft (a shaft connected to the display panel, i.e., the first body 1), and the second shaft 33 can be a BASE shaft (a shaft connected to the base, i.e., the second body 2). The connector 31, the first rotation shaft 32, and the second rotation shaft 33 of the rotation shaft assembly 3 can have different relative positions with each other during rotation. When the first rotation shaft 32 and the second rotation shaft 33 are connected to a body of the electronic apparatus, the different relative positions can include different included angles between the electronic apparatus and the two bodies connected to the first rotation shaft 32 and the second rotation shaft 33 caused by the rotation of the first rotation shaft 32 and/or the second rotation shaft 33. In some embodiments, the included angle can include 0°, 120°, 280°, and 360°. These different angles can represent different predetermined positions. The first predetermined position and the second predetermined position can refer to two different predetermined positions of the plurality of predetermined positions and cannot refer to a specific predetermined position. In the rotation shaft assembly 3 of embodiments of the present disclosure, rotation states of the first rotation shaft 32 and the second rotation shaft 33 can be switched at least at two predetermined positions of the first predetermined position and the second predetermined position.

In addition, the lock mechanism 34 can be configured to switch the first rotation shaft 32 and the second rotation shaft 33 through cooperation of a plurality of members. As shown in FIG. 2, FIG. 3, and FIG. 4, the plurality of members include the first rotation wheel 343, the second rotation wheel 344, and a sliding block 345. The first rotation wheel 343 and the first rotation shaft 32 can rotate coaxially. The second rotation wheel 344 and the second rotation shaft 33 can rotate coaxially. The sliding block 345 can be slidably arranged between the first rotation wheel 343 and the second rotation wheel 344. Each of the first rotation wheel 343 and the second rotation wheel 344 includes a concave member cooperating with the sliding block 345. When the concave member of the first rotation wheel 343 cooperates with the sliding block 345, the rotation of the connector 31 and the first rotation shaft 32 can be locked. When the concave member of the second rotation wheel 344 cooperates with the sliding block 345, the rotation of the connector 31 and the second rotation shaft 33 can be locked.

Meanwhile, when the first rotation shaft 32 rotates, the sliding block 345 can be compressed toward the second rotation shaft 33 through the rotation of the first rotation wheel 343. Similarly, when the second rotation shaft 33 rotates, the sliding block 345 can be compressed toward the first rotation shaft 32 by the rotation of the second rotation wheel 344.

For specific structures of the first rotation wheel 343, the second rotation wheel 344, and the sliding block 345, reference can be made to FIG. 2, FIG. 3, and FIG. 4. The first wheel 343 and the first rotation shaft 32 can be arranged coaxially and can include a plurality of concave members configured to lock the rotation of the first rotation shaft 32 at the plurality of different predetermined positions.

The above structure can cooperate with the lock member 341 to realize the cooperation between the first rotation shaft 32 and the second rotation shaft 33. As shown in FIG. 2, FIG. 3, and FIG. 4, the lock mechanism includes a lock member 341. When the first rotation shaft 32 rotates, the lock member 341 can move along an axial direction of the first rotation shaft 32 to a lock position or unlock position. When the lock member 341 is at the lock position, an end of the lock member 341 can cooperate with the second rotation shaft 33. Thus, at the first predetermined position, the relative rotation between the connector 31 and the second rotation shaft 33 can be locked. When the lock member 341 is at the unlock position, an end of the lock member 341 can cooperate with the second rotation shaft 33. Thus, at the second predetermined position, the relative rotation between the connector 31 and the second rotation shaft 33 can be unlocked.

In some embodiments, when the first body 1 and the second body 2 are at the first predetermined position, the lock member 341 can be at the lock position. The end of the lock member 341 can cooperate with the second rotation shaft 33 to lock the relative rotation between the second rotation shaft 33 and the connector 31. When the first body 1 and the second body 2 move from the first predetermined position to the second predetermined position, the first rotation shaft 32 can rotate and drive the lock member 341 to move along the axial direction of the first rotation shaft 32. When the first body 1 and the second body 2 are at the second predetermined position, the lock member 341 can move to the unlock position. Thus, the relative rotation between the second rotation shaft 33 and the connector 31 can be unlocked, and the second rotation shaft 33 can continue to rotate.

In addition, at the second predetermined position, the rotation of the first rotation shaft 32 can be blocked. Thus, as shown in FIG. 4, the lock mechanism 34 further includes a block member 346 fixed at the first rotation shaft 32. At the second predetermined position, the block member 346 can cooperate with the connector 31 to lock the rotation of the connector 31 and the first rotation shaft 32.

Figure 5:
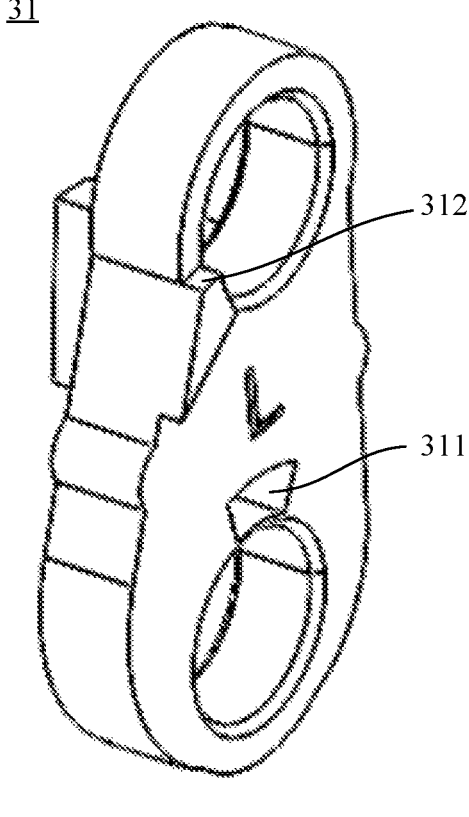
FIG. 5 illustrates a schematic structural diagram of a connector according to embodiments of the present disclosure.

In some embodiments, as shown in FIG. 4 and FIG. 5, the block member 346 is a stopper formed by a recess at an outer peripheral side of the first rotation wheel 343. The block 312 can be arranged at the connector 31. When the rotation shaft assembly 3 moves from the first predetermined position toward the second predetermined position, an end of the block member 346 can abut against an end of the block 312 to lock the rotation of the first rotation shaft 32 relative to the connector 31.

In the rotation shaft assembly 3 of embodiments of the present disclosure, a cooperation manner between the lock member 341 and the second rotation shaft 33 is not limited. For example, a protruded stopper can be arranged at the outer peripheral side of the second rotation shaft 33. An end of the stopper can abut against the end of the lock member 341 to lock the second rotation shaft 33. For another example, a groove can be arranged at the outer peripheral side of the second rotation shaft 33, and the end of the lock member 341 can be extended into the groove. A sidewall of the groove can abut against the lock member 341 to lock the second rotation shaft 33.

With reference to FIG. 2 and FIG. 3, in embodiments of the present disclosure, the lock mechanism 34 further includes a stopper member 342 arranged at the second rotation shaft 33. When the lock member 341 moves along an axial direction of the first rotation shaft 32 to the lock position, the end of the lock member 341 can abut against the end of the stopper member 342 to lock the relative rotation between the connector 31 and the second rotation shaft 33. When the lock member 341 moves along the axial direction of the first rotation shaft 32 to the unlock position, the end of the lock member 341 can be staggered from the end of the stopper member 342 to unlock the relative rotation between the connector 31 and the second rotation shaft 33.

In some embodiments, the stopper member 342 can be arranged at the outer peripheral side of the second rotation shaft 33, the stopper member 342 can include two ends configured to abut against the lock member 341. The two ends can be axially arranged along the second rotation shaft 33. The two ends may not be perpendicular to the second rotation shaft 33. In some embodiments, the two ends can be arranged in parallel to the second rotation shaft 33. The two ends can be a first end and a second end. The first end can correspond to the lock position. The second end can correspond to the unlock position. The first end and the second end can have an included angle.

A manner of the first rotation shaft 32 driving the lock member 341 to move is not limited. For example, a gear set can be sleeved on the first rotation shaft 32. A rack extending along the axial direction of the first rotation shaft 32 can be fixed at the lock member 341. The rack can be engaged with a corresponding gear of the gear set. When the first rotation shaft 32 rotates, the gear set can be driven to rotate. Thus, the lock member 341 can be driven to move along the axial direction of the first rotation shaft 32 through the rack. For another example, a spiral guide structure can be arranged at the first rotation shaft 32. The lock member 341 can move through threaded cooperation with the first rotation shaft.

In embodiments of the present disclosure, the lock member 341 can be spirally connected to the first rotation shaft 32.

To ensure the spiral connection and prevent the lock member 341 from being driven by the first rotation shaft 32 to rotate, a corresponding position-limiting structure needs to be arranged to limit the lock member 341 to move along the axial direction of the first rotation shaft 32.

A form of the position-limiting structure is not limited. For example, the end of the lock member 341 can cooperate with the second rotation shaft 33 to limit the position of the lock member 341 through the second rotation shaft 33. For another example, a corresponding guide member 3412 can be arranged at the lock member 341 or the connector 31. The guide member 3412 and the lock member 341 can cooperate to limit the position of the lock member 341.

For example, in embodiments of the present disclosure, an arc-shaped recess can be arranged at one end of the lock member 341 close to the second rotation shaft 33. The arch-shaped recess can be arranged to be fitted to the peripheral side of the second rotation shaft 33. Thus, the second rotation shaft 33 can be equivalent to a guide rail extending along the axial direction of the second rotation shaft 33. When the first rotation shaft 32 rotates, the second rotation shaft 33 can limit the position of the lock member 341 to ensure the movement of the lock member 341.

Figure 6:
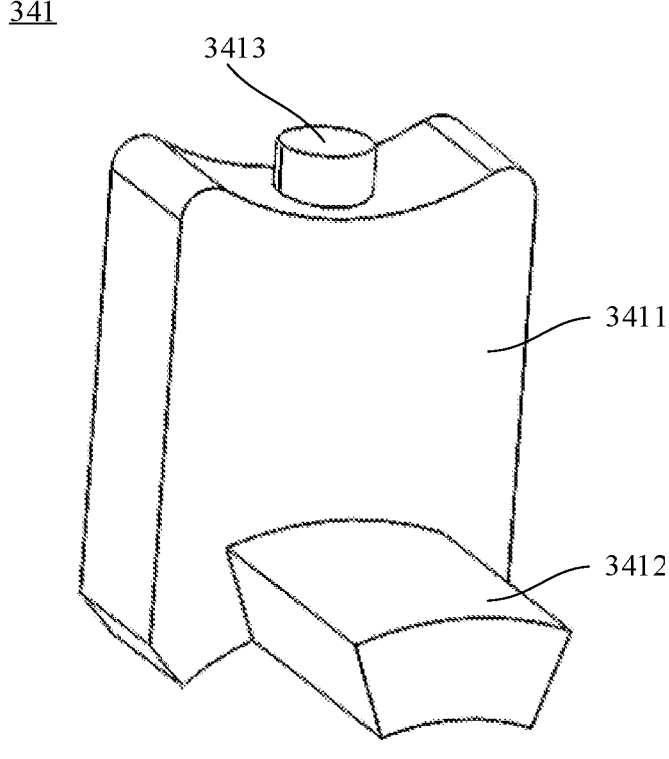
FIG. 6 illustrates a schematic structural diagram of a lock member according to embodiments of the present disclosure.

With reference to FIG. 6, in some embodiments, the lock member 341 includes a lock body 3411 and a guide member 3412 that are fixedly connected. The lock body 3411 extends along a radial direction of the first rotation shaft 32. The guide member 3412 extends along the axial direction of the first rotation shaft 32. A guide hole 311 is arranged at the connector 31 corresponding to the guide member 3412. The guide member 3412 can be slidingly extended into the guide hole 311.

In some embodiments, the lock body 3411 can be close to an end of the second rotation shaft 33 and can be configured to cooperate with the stopper member 342 of the second rotation shaft 33. The lock body 3411 can be close to an end of the first rotation shaft 32 and can be configured to be spirally connected to the first rotation shaft 32. The guide member 3412 can be fixed at the lock body 3411. A length of the guide member 3412 along a movement direction of the lock member 341 can be greater than a travel distance of the lock member 341. Thus, the guide member 3412 can remain in the guide hole 311 during the movement. When the first rotation shaft 32 rotates, since the guide member 3412 and the guide hole 311 cooperate to limit the position, the lock member 341 can only move along the axial direction of the first rotation shaft 32 to ensure the spiral connection to drive the lock member 341 to move.

In some other embodiments of the present disclosure, positions of the guide member 3412 and the guide hole 311 can be exchanged. That is, the guide member 3412 can be arranged on the side of the connector 31 close to the lock member 341. The guide hole 311 can be arranged at the lock member 341 corresponding to the guide member 3412. The guide member 3412 can slide in the guide hole 311 along the axial direction of the first rotation shaft 32 to limit the position of the lock member 341.

Shapes of the guide member 3412 and the guide hole 311 are not limited, as long as cross-sectional shapes of the guide member 3412 and the guide hole 311 are consistent. For example, the cross-sectional shapes of the guide member 3412 and the guide hole 311 can be circular. For another example, the cross-sectional shapes of the guide member 3412 and the guide hole 311 can be rectangular. With reference to FIG. 6, the cross-sectional shapes of the guide member 3412 and the guide hole 311 are fan-shaped. Two sides of the guide member 3412 close to the first rotation shaft 32 and the second rotation shaft 33 can be arc-shaped.

The position of the guide member 3412 is not limited. For example, the guide member 3412 can be arranged at an end of the lock body 3411 close to the first rotation shaft 32. For another example, the guide member 3412 can be arranged at the middle of the lock body 3411. For another example, the guide 3412 can be arranged at an end of the lock body 3411 close to the second rotation shaft 33. When the guide member 3412 is arranged at the end of the lock body 3411, the end of the guide member 3412 and the end of the lock body 3411 can be co-planar. The guide hole 311 can communicate with the through-hole of the connector 31 configured for the first rotation shaft 32 or the second rotation shaft 33 to pass through.

In addition, a number of the guide members 3412 is not limited. For example, one guide member 3412 can be provided. The one guide member can be arranged at the middle position on a side of the lock body 3411. For another example, two guide members 3412 can be provided. The two guide members 3412 can be symmetrically arranged with respect to the lock body 3411.

Accordingly, the lock member 341 can be limited by a plurality of connectors 31. For example, the guide members 3412 can be fixed on the two sides of the lock body 3411 along a movement direction of the lock body 3411. The guide members 3412 on the two sides of the lock body 3411 can extend into the guide holes 311 of the connectors 31, and the guiding parts 3412 at both sides respectively extend into the guide holes 311 corresponding to the connectors 31 on the sides, respectively. For another example, the lock member 341 can include the guide hole 311. The guide member 3412 can slide in the guide hole 311. Two ends of the guide member 3412 can be fixed to different connectors 31.

An implementation of the spiral connection is not limited to the present disclosure. For example, the spiral connection can be realized by using a spiral guide rail and a sliding block. For another example, the spiral connection can be realized in a manner similar to a screw-nut mechanism.

With reference to FIG. 2, in some embodiments, a spiral guide groove 323 is arranged on the outer side of the first rotation shaft 32. The spiral guide groove 323 can extend in an axial direction of the first rotation shaft 32. An end of the lock member 341 close to the first rotation shaft 32 can slidably cooperate with the spiral guide groove 323.

In some embodiments, a sliding member 3413 can be arranged at the end of the lock member 341 close to the first rotation shaft 32. The sliding member 3413 can extend into the spiral guide groove 323. When the first rotation shaft 32 rotates, the sliding member 3413 can slide in the spiral guide groove 323 to drive the lock member 341 to move along the axial direction of the first rotation shaft 32.

The shape of the sliding member 3413 is not limited. For example, the sliding member 3413 can be in a cylindrical shape. For another example, the sliding member 3413 can be in an oval shape. For another example, the sliding member 3413 can be a prism.

To prevent the sliding member 3413 from sliding out of the spiral guide groove 323, with reference to FIG. 6, a recess is formed at the end of the lock member 341 close to the first rotation shaft 32. The recess can be fitted to the peripheral side of the first rotation shaft 32. The sliding member 3413 can be arranged in the middle of the recess to limit the position of the sliding member 3413.

In some other embodiments of the present disclosure, a spiral guide rail can be arranged on the outer side the first rotation shaft 32. The spiral guide rail can extend along the axial direction of the first rotation shaft 32. A sliding groove can be arranged at the end of the lock member 341 close to the first rotation shaft 32 to cooperate with the spiral guide rail.

In some embodiments of the present disclosure, the lock member 341 can include a connection cylinder 3414 and a lock member 3415 that are fixedly connected together. The first rotation shaft 32 can pass through the connection cylinder 3414 and threadedly cooperate with the connection cylinder 3414.

In some embodiments, the connection cylinder 3414 can be sleeved on the first rotation shaft 32. The connection cylinder 3414 can have an inner thread. A member of the first rotation shaft 32 corresponding to the connection cylinder 3414 can have an outer thread to form a mechanism similar to a screw-nut mechanism. When the first rotation shaft 32 rotates, the connection cylinder 3414 can move along the axis of the first rotation shaft 32 through the cooperation of the inner thread and the outer thread. The end of the lock member 3415 close to the first rotation shaft 32 can be fixed to the connection cylinder 3414. The end of the lock member 3415 close to the second rotation shaft 33 can be configured to cooperate with the stopper member 342 of the second rotation shaft 33. Thus, a combination of the connection cylinder 3414 and the lock member 3415 can be equivalent to the lock body 3411.

The spiral guide groove 323 and the stopper member 342 can be directly or indirectly arranged at the first rotation shaft 32 or the second rotation shaft 33.

To reduce the processing difficulty of the first rotation shaft 32 and the second rotation shaft 33, as shown in FIG. 4, the first rotation shaft 32 includes a first shaft body 321. A first shaft sleeve 322 rotating along with the first shaft body 321 is sleeved on the first shaft body 321. The second rotation shaft 33 includes a second shaft body 331. A second shaft sleeve 332 rotating along with the second shaft body 331 is sleeved on the second shaft body 331. The spiral guide groove 323 can be arranged at the outer peripheral side of the first shaft sleeve 322. The stopper member 342 can be arranged at the outer peripheral side of the second shaft sleeve 332.

A connection mode of the first shaft body 321 and the first sleeve 322 is not limited, as long as the first shaft body 321 and the first sleeve 322 can rotate co-axially. For example, the first shaft body 321 can be connected to the first shaft sleeve 322 through a key. For another example, the first shaft body 321 can be connected to the first shaft sleeve 322 through a spline connection. For another example, the first shaft body 321 can be connected to the first shaft sleeve 322 through an interference fit. For the connection between a second shaft body 331 and the second shaft sleeve 332, references can be made above, which is not repeated here.

To illustrate the rotation shaft assembly 3 of embodiments of the present disclosure and a rotation of the rotation shaft assembly 3 in the electronic apparatus, embodiments of the present disclosure also provide a rotation method of the electronic apparatus. The electronic apparatus can be applied to any electronic apparatus having the rotation shaft assembly 3 with a plurality of rotation shafts. In some embodiments, the body of the electronic apparatus can perform a rotation operation by rotating the first rotation shaft 32 and the second rotation shaft 33. When the body of the electronic apparatus is rotated to the first predetermined position around the second rotation shaft 33, the rotation of the first rotation shaft 32 can be unlocked, and the rotation of the second rotation shaft 33 can be locked. When the body of the electronic apparatus is rotated around the first rotation shaft 32 to the second predetermined position, the rotation of the first rotation shaft 32 can be locked, and the rotation of the second rotation shaft 33 can be unlocked. Thus, the body of the electronic apparatus can be rotated around the second rotation shaft 33.

In the rotation method of the electronic apparatus of embodiments of the present disclosure, a switching logic can be defined for the rotation operation of the body of the electronic apparatus performed by the rotation of the first rotation shaft 32 and the second rotation shaft 33. For example, when the body of the electronic apparatus is rotated to the first predetermined position around the second rotation shaft 33, the rotation of the first rotation shaft 32 can be unlocked, and the rotation of the second rotation shaft 33 can be locked. When the body of the electronic apparatus rotates to the second predetermined position around the first rotation shaft 32, the rotation of the first rotation shaft 32 can be locked, and the rotation of the second rotation shaft 33 can be unlocked. That is, at some specific positions, the rotation of the first rotation shaft 32 and the second rotation shaft 33 can be switched with a good logic to adapt to the rotation operation to prevent the members from being damaged.

In the rotation method of the electronic apparatus of embodiments of the present disclosure, the switching logic can be defined for the body of the electronic apparatus to perform the rotation operation through the rotation of the first rotation shaft 32 and the second rotation shaft 33. For example, when the body of the electronic apparatus is rotated to the first predetermined position around the second rotation shaft 33, the rotation of the first rotation shaft 32 can be unlocked, and the rotation of the second rotation shaft 33 can be locked. When the body of the electronic apparatus is rotated to the second predetermined position around the first rotation shaft 32, the rotation of the first rotation shaft 32 can be locked, and the rotation of the second rotation shaft 33 can be unlocked. Thus, the body of the electronic apparatus can be rotated around the second rotation shaft 33. That is, two witching points can be arranged. At a switching point, one of the rotation shafts can be locked and the other one of the rotation shafts can be unlocked to perform switching at a plurality of positions to prevent the rotation shaft from colliding with the table when the switching cannot be performed in time. Thus, the linkage movement of the two rotation shafts can be avoided, and a good switching logic can be defined for the first rotation shaft 32 and the second rotation shaft 33. Therefore, the rotation operation can be performed smoothly, which solves the problem of the display panel being damaged when the switching logic is not synchronous.

Taking a laptop computer as an example, the first rotation shaft 32 can be the LCD shaft (i.e., the shaft of the first body 1 connected to the display panel,), and the second rotation shaft 33 can be the BASE shaft (i.e., the shaft of the second body 2 connected to the base). The rotation modes required by the laptop computer of embodiments of the present disclosure are shown in the drawing. Four key positions of 0°, 120°, 280°, and 360° can be predetermined positions. When the laptop computer needs to be opened, the laptop can have the following states.

Figure 7:
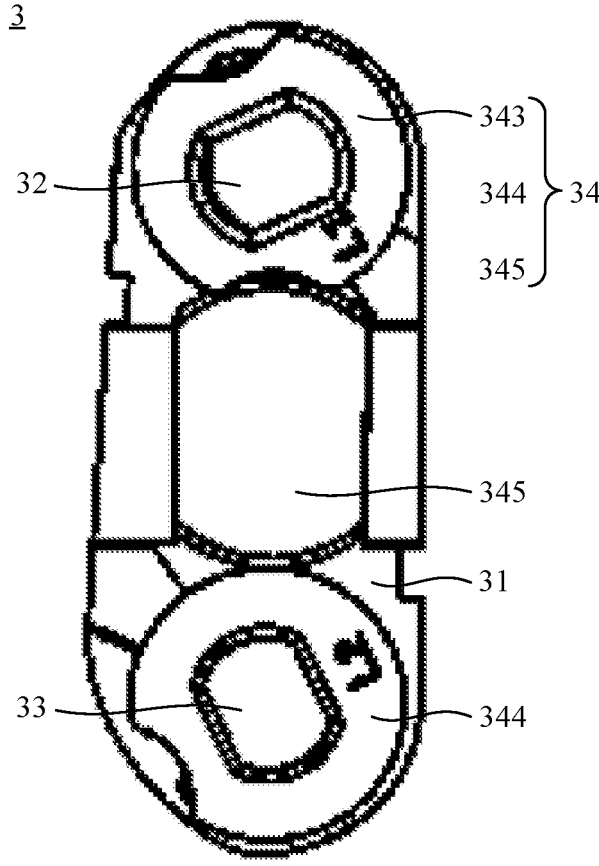
FIG. 7 illustrates a schematic diagram showing a first wheel and a second wheel at an original position according to embodiments of the present disclosure.
Figure 8:
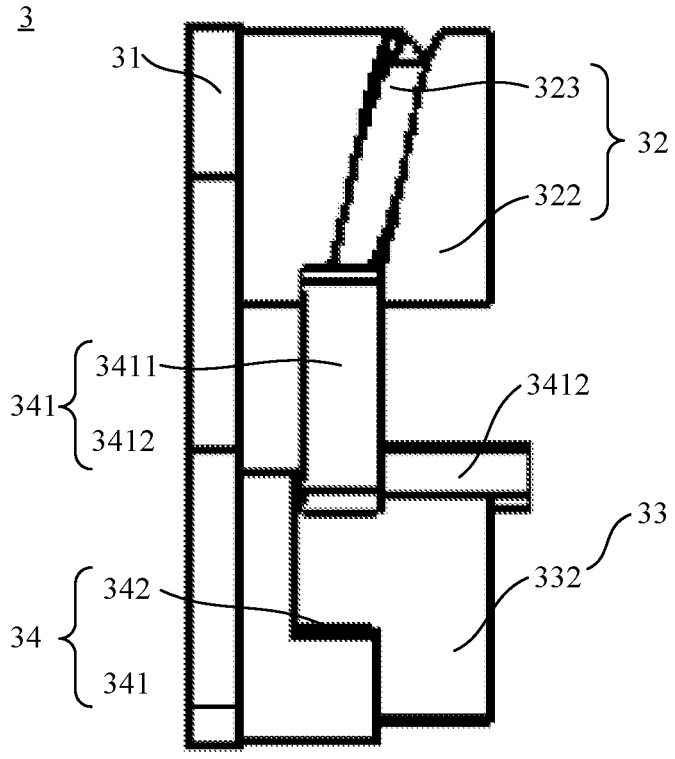
FIG. 8 illustrates a schematic diagram showing a lock member at an original position according to embodiments of the present disclosure.
Figure 15:
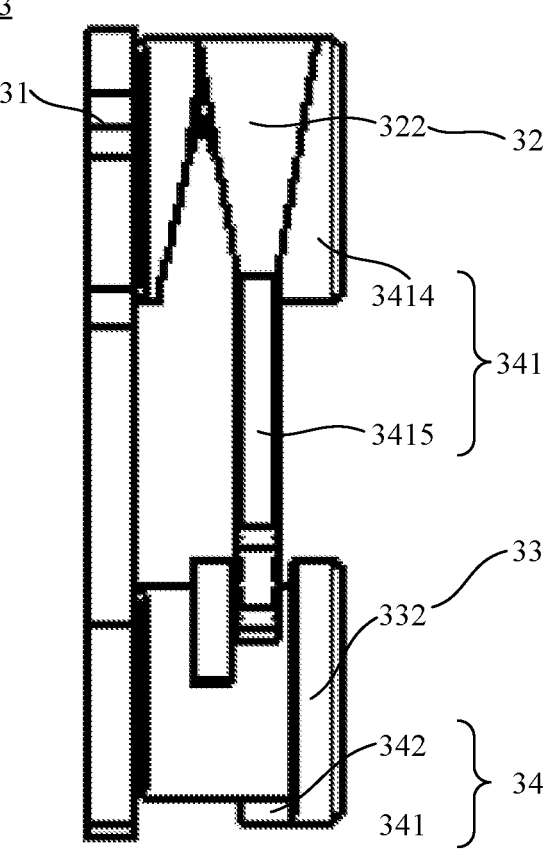
FIG. 15 illustrates a schematic diagram showing a lock member at an initial position according to embodiments of the present disclosure.

As shown in FIG. 7, FIG. 8, and FIG. 15, in 0° state, the first rotation shaft 32 is locked and the second rotation shaft 33 is unlocked. In some embodiments, the concave member of the second rotation wheel 344 can be staggered from the sliding block 345. The second rotation wheel 344 can push the sliding block 345 toward the first rotation wheel 343. The sliding block 345 can be snapped in the concave member of the first rotation wheel 343 to lock the first rotation shaft 32. Then, the lock member 341 can unlock the second rotation shaft 33.

When the display panel starts to rotate, with reference to FIG. 7 to FIG. 10, in a process of rotating from 0° to 120°, the concave member of the first rotation wheel 343 and the sliding block 345 are locked, and the sliding block 345 slides relative to the surface of the first rotation wheel 343. The second rotation shaft 33 can rotate and drive the first end to move toward the lock member 341, and the entire display panel can rotate around the second rotation shaft 33.

Figure 9:
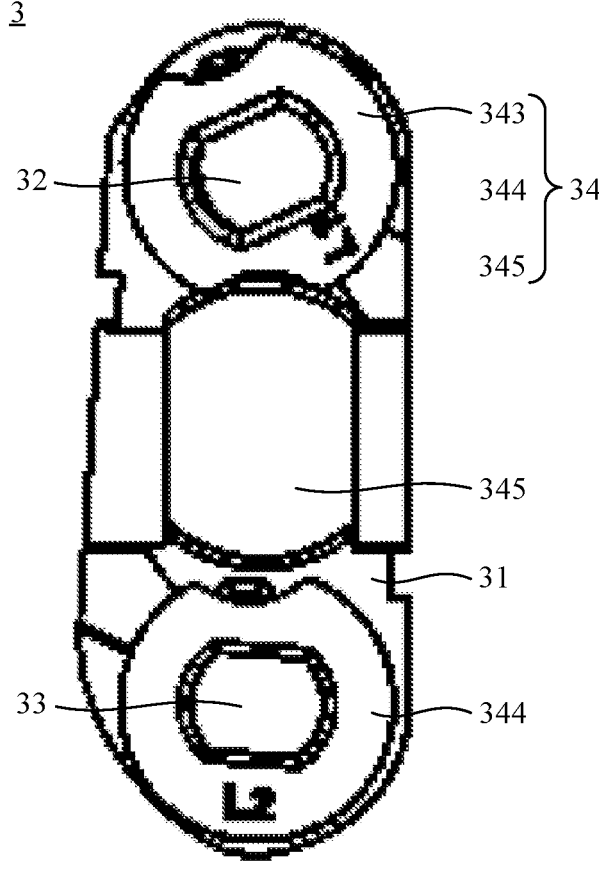
FIG. 9 illustrates a schematic diagram showing a first wheel and a second wheel at a first predetermined position according to embodiments of the present disclosure.
Figure 10:
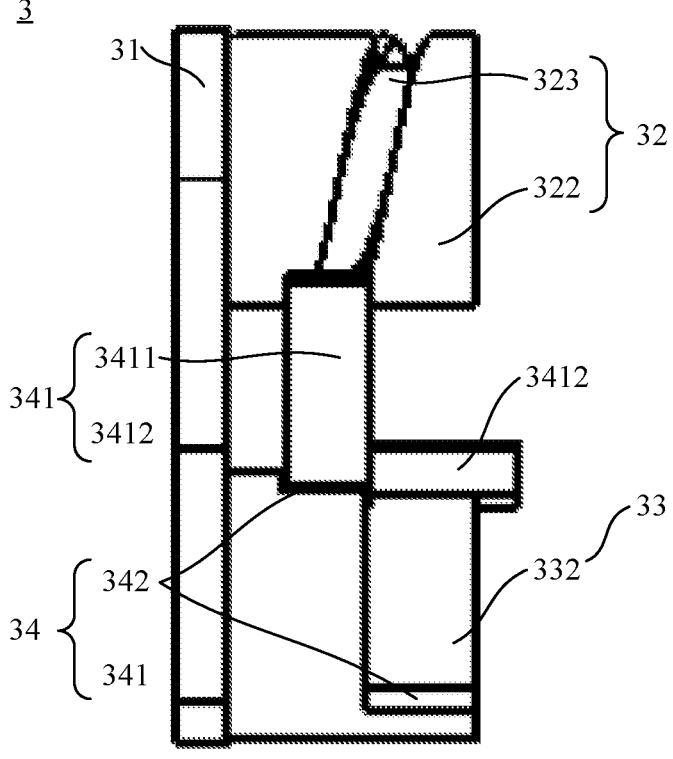
FIG. 10 illustrates a schematic diagram showing a lock member at a first predetermined position according to embodiments of the present disclosure.
Figure 16:
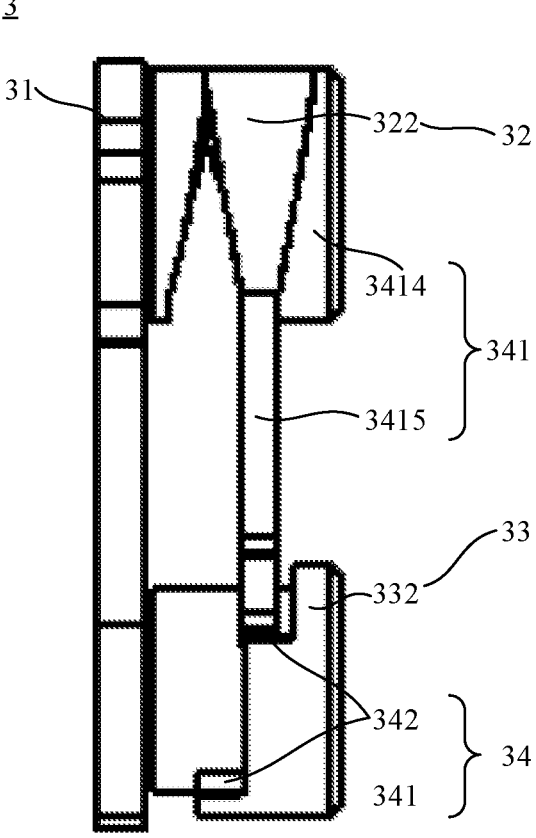
FIG. 16 illustrates a schematic diagram showing a lock member at a first predetermined position according to some other embodiments of the present disclosure.

With reference to FIG. 9, FIG. 10, and FIG. 16, in 120° state, the second rotation wheel 344 is driven by the second rotation shaft 33 to rotate to the concave member corresponding to the sliding block 345. Then, the first rotation shaft 32 does not rotate relatively. The concave member of the first rotation wheel 343 can also correspond to the sliding block 345. The sliding block 345 can be in a freely movable state. The lock member 341 is at the lock position and just abuts against the first end of the second rotation shaft 33 to lock the second rotation shaft 33. Then, the first rotation shaft 32 can be unlocked, and the second rotation shaft 33 can be locked. The rotation of the entire display panel can be switched to rotate around the first rotation shaft 32. The first predetermined position can be a position of 120°.

With reference to FIG. 9 to FIG. 12, the display panel continues to be rotated. In a process of rotating from 120° to 280°, the first rotation shaft 32 can drive the first rotation wheel 343 to rotate. Thus, the concave member of the first rotation wheel 343 can be staggered from the sliding block 345. The sliding block 345 can be compressed toward the second rotation wheel 344 and can be snapped with the concave member of the second rotation wheel 344. The sliding block 345 can slide relative to the surface of the first rotation wheel 343. Meanwhile, the rotation of the first rotation shaft 32 can drive the lock member 341 to move towards the unlock position. The lock member 341 can be gradually separated from the first end, and the entire display panel can rotate around the first rotation shaft 32.

Figure 11:
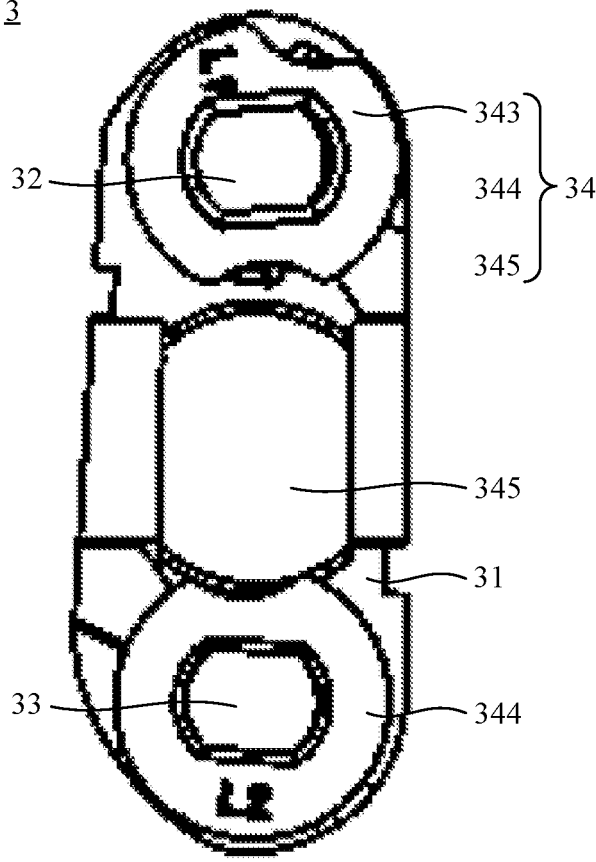
FIG. 11 illustrates a schematic diagram showing a first wheel and a second wheel at a second predetermined position according to embodiments of the present disclosure.
Figure 12:
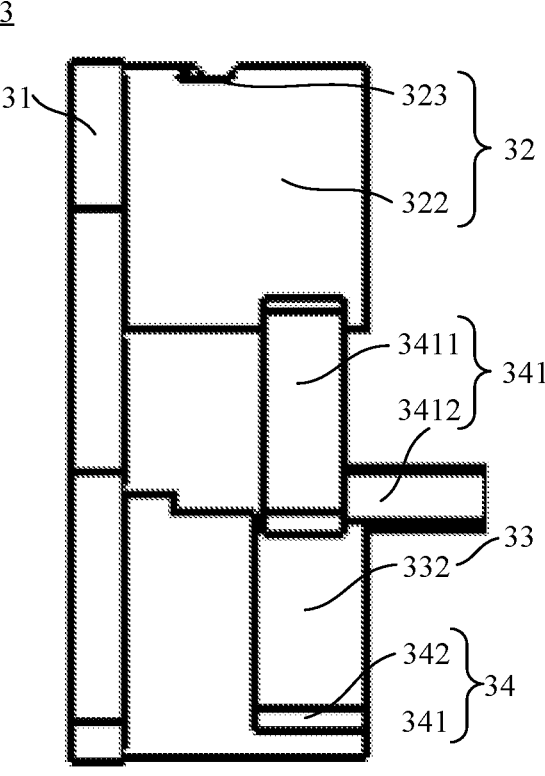
FIG. 12 illustrates a schematic diagram showing a lock member at a second predetermined position according to embodiments of the present disclosure.
Figure 17:
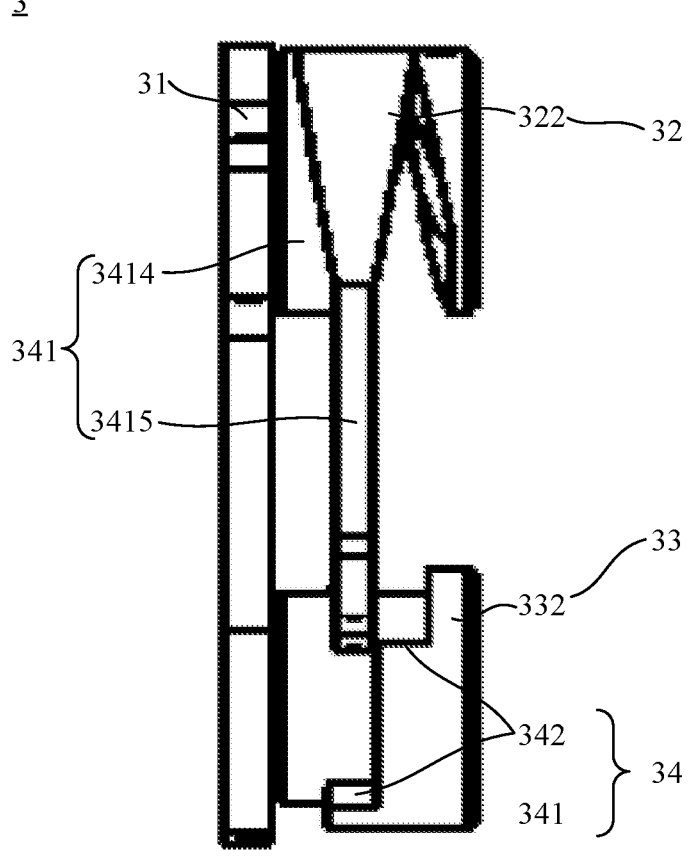
FIG. 17 illustrates a schematic diagram showing a lock member at a second predetermined position according to some other embodiments of the present disclosure.

With reference to FIG. 11, FIG. 12, and FIG. 17, in 280° state, the first rotation shaft 32 drives the first rotation wheel

343 to rotate. Thus, the concave member of the first rotation wheel 343 can correspond to the sliding block 345. Then, the concave member of the second rotation wheel 344 can also correspond to the sliding block 345, and the sliding block 345 can be in a free-moving state. Meanwhile, the first rotation shaft 32 can be locked by the block member 346 and the block 312. The lock member 341 can move to the unlock position to unlock the second rotation shaft 33. Then, the entire display panel can be switched to rotate around the second rotation shaft 33. The second predetermined position can be a position of 280°.

With reference to FIG. 11 to FIG. 14, the display panel continues to be rotated. In a process of rotating from 280° to 360°, the second rotation wheel 344 can be driven to rotate by the rotation of the second rotation shaft 33. The second rotation wheel 344 can push the sliding block 345 towards the first rotation wheel 343 and can cooperate with the concave member of the first rotation wheel 343 to lock the first rotation shaft 32. The sliding block 345 can slide relative to the surface of the second rotation wheel 344. Then, the second rotation shaft 33 can drive the second end to move toward the lock member 341.

Figure 13:
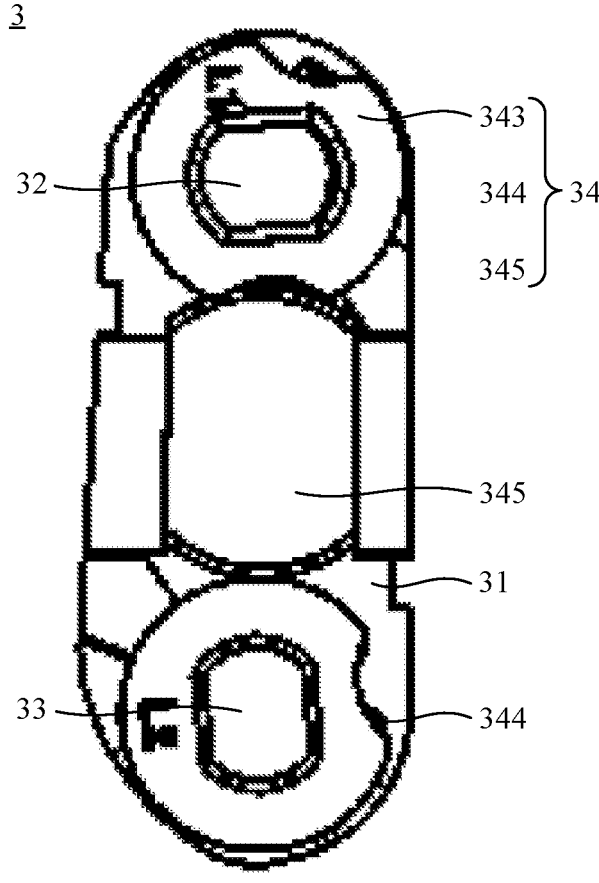
FIG. 13 illustrates a schematic diagram showing a first wheel and a second wheel at an ending position according to embodiments of the present disclosure.
Figure 14:
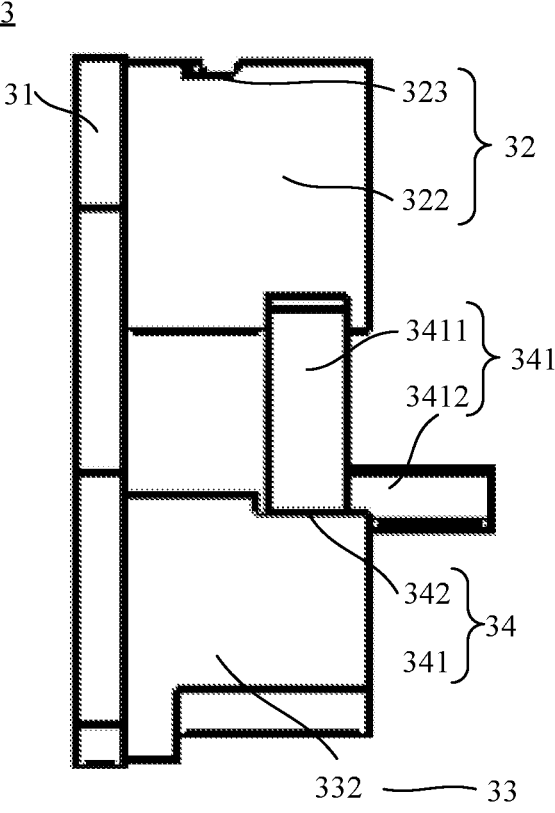
FIG. 14 illustrates a schematic diagram showing a lock member at an ending position according to embodiments of the present disclosure.
Figure 18:
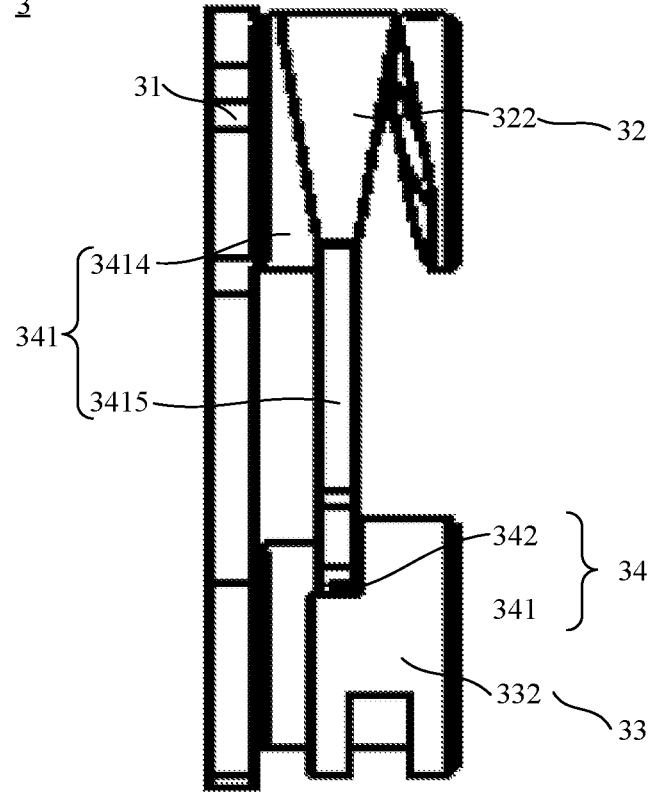
FIG. 18 illustrates a schematic diagram showing a lock member at an ending position according to some other embodiments of the present disclosure.

With reference to FIG. 13, FIG. 14, and FIG. 18, in 360° state, the second end of the second rotation shaft 33 abuts against the lock member 341 to lock the second rotation shaft 33. The first rotation shaft 32 can be further locked by the concave member of the first rotation wheel 343 and the block member 346. Positions of the first rotation shaft 32 and the second rotation shaft 33 can be limited to prevent the display panel from continuing to be rotated.

When the laptop computer needs to be closed, a switching process can be opposite to the switching process above.

The first predetermined position and the second predetermined position of embodiments of the present disclosure can include 120° state and 280° state above, respectively. Thus, the switching of the rotation shafts in at least two predetermined positions can be realized.

The angle can be any other desired angular position of the system as needed. Moreover, the determination and adjustment of the angle can be achieved by adjusting the position where the lock member 341 is triggered and the positions where the concave members of the first wheel 343 and the second wheel 344 are arranged, which is not described in detail here. The above describes some embodiments of the present disclosure and is not intended to limit the scope of the present disclosure. All modifications of equivalent structures and equivalent processes, which are made according to the contents of the specification and the drawings of the present disclosure, can be directly or indirectly applied to other related technical fields and are within the scope of the present disclosure.

What is claimed is:

1. A rotation shaft assembly for connecting a first body and a second body and enabling the first body and the second body to rotate relative to each other, comprising:
   a connector;
   a first rotation shaft rotatably connected to the connector;
   a second rotation shaft rotatably connected to the connector; and
   a lock mechanism arranged between the first rotation shaft and the second rotation shaft and configured to switch between a rotation of the first rotation shaft and a rotation of the second rotation shaft when an angle of relative rotation between the first body and the second body is in a first predetermined state or a second predetermined state, the angle of relative rotation passing through the first predetermined state and the second predetermined state, respectively, as the angle of relative rotation changes from an initial state to an end state, in response to the angle of relative rotation being in the first predetermined state while proceeding toward the end state, the rotation of the first rotation shaft transitioning to being unlocked, and the rotation of the second rotation shaft transitioning to being locked, and in response to the angle of relative rotation being in the second predetermined state while proceeding toward the end state, the rotation of the first rotation shaft transitioning to being locked, and the rotation of the second rotation shaft transitioning to being unlocked, wherein the lock mechanism includes a lock member configured, in response to the first rotation shaft being rotated, to move in an axial direction of the first rotation shaft, the lock member including a guide member extending in the axial direction of the first rotation shaft, the connector including a guide hole arranged corresponding to the guide member, and the guide member extending slidably into the guide hole such that the lock member is constrained against rotation relative to the connector while moving in the axial direction of the first rotation shaft.

2. The rotation shaft assembly of claim 1, wherein
in response to the first rotation shaft being rotated, the lock member being moved in the axial direction of the first rotation shaft to a lock position or an unlock position;
in response to the lock member being at the lock position, an end of the lock member cooperating with the second rotation shaft to lock relative rotation between the end of the lock member and the second rotation shaft in response to the angle of relative rotation being in the first predetermined state while proceeding toward the end state; and
in response to the lock member being at the unlock position, the end of the lock member cooperating with the second rotation shaft to unlock relative rotation between the connector and the second rotation shaft in response to the angle of relative rotation being in the second predetermined state while proceeding toward the end state.

3. The rotation shaft assembly of claim 2, wherein the lock mechanism further includes:
a stopper member:
in response to the lock member being moved to the lock position in the axial direction of the first rotation shaft, the end of the lock member abutting against an end of the stopper member to lock the relative rotation between the connector and the second rotation shaft; and
in response to the lock member being moved to the unlock position in the axial direction of the first rotation shaft, the end of the lock member being staggered away from the end of the stopper member to unlock the relative rotation between the connector and the second rotation shaft.

4. The rotation shaft assembly of claim 3, wherein the lock member is spirally connected to the first rotation shaft.

5. The rotation shaft assembly of claim 4, wherein:
a spiral guide groove is arranged at an outer side of the first rotation shaft;
the spiral guide groove extends along the axial direction of the first rotation shaft; and
an end of the lock member close to the first rotation shaft cooperating with the spiral guide groove.

6. The rotation shaft assembly of claim 2, wherein the lock member includes:
a lock body extending in a radial direction of the first rotation shaft.

7. The rotation shaft assembly of claim 2, wherein the lock member includes:
a connection cylinder, the first rotation shaft passing through the connection cylinder and cooperating with a thread of the connection cylinder; and
a lock part fixedly connected to the connection cylinder.

8. The rotation shaft assembly of claim 1, wherein the lock mechanism further includes a block member fixed at the first rotation shaft, in response to the angle of relative rotation being in the second predetermined state while proceeding toward the end state, the block member and the connector cooperating to lock the rotation of the connector and the first rotation shaft.

9. The rotation shaft assembly according to claim 1, wherein the angle of relative rotation changes from the initial state to the end state through a combination of a) the first rotation shaft rotating in a single first direction while the second rotation shaft being locked and b) the second rotation shaft rotating in a single second direction opposite of the first direction while the first rotation shaft being locked.

10. The rotation shaft assembly according to claim 1, wherein the initial state corresponds to the angle of relative rotation between the first body and the second body being at 0°, and the end state corresponds to the angle of relative rotation between the first body and the second body being at 360°.

11. The rotation shaft assembly according to claim 1, wherein the first rotation shaft is locked and the second rotation shaft is unlocked before the angle of relative rotation reaches the first predetermined state or after the angle of relative rotation passes the second predetermined state, and the first rotation shaft is unlocked and the second rotation shaft is locked when the angle of relative rotation is between the first predetermined state and the second predetermined state.

12. An electronic apparatus, comprising:
a first body;
a second body; and
a rotation shaft assembly for connecting the first body and the second body and enabling the first body and the second body to rotate relative to each other, including:
a connector;
a first rotation shaft rotatably connected to the connector;
a second rotation shaft rotatably connected to the connector; and
a lock mechanism arranged between the first rotation shaft and the second rotation shaft and configured to switch between a rotation of the first rotation shaft and a rotation of the second rotation shaft when an angle of relative rotation between the first body and the second body is in a first predetermined state or a second predetermined state, the angle of relative rotation passing through the first predetermined state and the second predetermined state, respectively, as the angle of relative rotation changes from an initial state to an end state, in response to the angle of relative rotation being in the first predetermined state while proceeding toward the end state, the rotation of the first rotation shaft transitioning to being unlocked, and the rotation of the second rotation shaft transitioning to being locked, and in response to the angle of relative rotation being in the second predetermined state while proceeding toward the end state, the rotation of the first rotation shaft transitioning to being locked, and the rotation of the second rotation shaft transitioning to being unlocked, wherein the lock mechanism includes a lock member configured, in response to the first rotation shaft being rotated, to move in an axial direction of the first rotation shaft, the lock member including a guide member extending in the axial direction of the first rotation shaft, the connector including a guide hole arranged corresponding to the guide member, and the guide member extending slidably into the guide hole such that the lock member is constrained against rotation relative to the connector while moving in the axial direction of the first rotation shaft.

13. The electronic apparatus of claim 12, wherein in response to the first rotation shaft being rotated, the lock member being moved in the axial direction of the first rotation shaft to a lock position or an unlock position;

in response to the lock member being at the lock position, an end of the lock member cooperating with the second rotation shaft to lock relative rotation between the end of the lock member and the second rotation shaft in response to the angle of relative rotation being in the first predetermined state while proceeding toward the end state; and in response to the lock member being at the unlock position, the end of the lock member cooperating with the second rotation shaft to unlock relative rotation between the connector and the second rotation shaft in response to the angle of relative rotation being in the second predetermined state while proceeding toward the end state.

14. The electronic apparatus of claim 13, wherein the lock mechanism further includes:

a stopper member:

in response to the lock member being moved to the lock position in the axial direction of the first rotation shaft, the end of the lock member abutting against an end of the stopper member to lock the relative rotation between the connector and the second rotation shaft; and in response to the lock member being moved to the unlock position in the axial direction of the first rotation shaft, the end of the lock member being staggered away from the end of the stopper member to unlock the relative rotation between the connector and the second rotation shaft.

15. The electronic apparatus of claim 14, wherein the lock member is spirally connected to the first rotation shaft.

16. The electronic apparatus of claim 15, wherein:

a spiral guide groove is arranged at an outer side of the first rotation shaft;

the spiral guide groove extends along the axial direction of the first rotation shaft; and an end of the lock member close to the first rotation shaft cooperating with the spiral guide groove.

17. The electronic apparatus of claim 13, wherein the lock member includes:

a lock body extending in a radial direction of the first rotation shaft.

18. The electronic apparatus of claim 13, wherein the lock member includes:

a connection cylinder, the first rotation shaft passing through the connection cylinder and cooperating with a thread of the connection cylinder; and a lock part fixedly connected to the connection cylinder.

19. The electronic apparatus of claim 12, wherein the lock mechanism further includes a block member fixed at the first rotation shaft, in response to the angle of relative rotation being in the second predetermined state while proceeding toward the end state, the block member and the connector cooperating to lock the rotation of the connector and the first rotation shaft.

20. A rotation method of an electronic apparatus, comprising:

performing a rotation operation on a first body or a second body of the electronic apparatus through a rotation of a first rotation shaft and a rotation of a second rotation shaft, the first rotation shaft and the second rotation shaft not being capable of rotating simultaneously relative to a connector connected to the first rotation shaft and the second rotation shaft, an angle of relative rotation between the first body and the second body of the electronic apparatus passing through a first predetermined state and a second predetermined state, respectively, as the angle of relative rotation changes from an initial state to an end state;

in response to the first rotation shaft being rotated, moving a lock member in an axial direction of the first rotation shaft while constraining the lock member against rotation relative to the connector by sliding a guide member of the lock member in a guide hole of the connector;

in response to the first body or the second body of the electronic apparatus being rotated such that the angle of relative rotation reaches the first predetermined state while proceeding toward the end state, unlocking the rotation of the first rotation shaft, and locking the rotation of the second rotation shaft; and in response to the first body or the second body of the electronic apparatus being rotated such that the angle of relative rotation reaches the second predetermined state while proceeding toward the end state, locking the rotation of the first rotation shaft, and unlocking the rotation of the second rotation shaft to rotate the body of the electronic apparatus around the second rotation shaft.

* * * * *